(12) United States Patent  
Muta

(10) Patent No.: US 6,448,958 B1
(45) Date of Patent: Sep. 10, 2002

(54) REMOTE CONTROL METHOD, SERVER AND RECORDING MEDIUM

(75) Inventor: Hidemasa Muta, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/111,131

(22) Filed: Jul. 3, 1998

(30) Foreign Application Priority Data

Jul. 4, 1997 (JP) .............................................. 9-179417

(51) Int. Cl.$^7$ ............................ G09G 5/00; G06F 13/00
(52) U.S. Cl. ........................ 345/169; 118/127; 118/342
(58) Field of Search ............................ 707/513; 702/2; 358/442; 395/200.47, 680; 345/127, 129, 358, 342, 169, 118

(56) References Cited

U.S. PATENT DOCUMENTS

| 5,455,687 | A | | 10/1995 | Fukui et al. ................. 358/434 |
| 5,745,759 | A | * | 4/1998 | Hayden et al. ............. 395/680 |
| 5,812,777 | A | * | 9/1998 | Leigh .................... 395/200.47 |
| 6,023,714 | A | * | 2/2000 | Hill et al. .................... 707/513 |
| 6,054,990 | A | * | 4/2000 | Tran ........................... 345/358 |
| 6,064,943 | A | * | 5/2000 | Clark, Jr. et al. ............... 702/2 |
| 6,072,598 | A | * | 6/2000 | Tso ............................. 358/442 |

FOREIGN PATENT DOCUMENTS

EP 0719016 A2 6/1996 ........... H04L/29/06

OTHER PUBLICATIONS

"GloMop: Global Mobile Computing by Proxy," http://www.cs.berkeley.edu, Sep. 13, 1995, pp. 1–12.

A. Fox and E. A. Brewer, "Reducing WWW Latency and Bandwidth Requirements by Real–Time Distillation," Computer Networks and ISDN Systems 28, U. of California, pp. 1445–1456, 1996.

J. Zhang, "The Expressive Task Specification and Adaptive Image Data Handling for Mobile Applications," Computer Graphics Center (ZGDV) German;y 1997, pp.217–231.

T. Shimada et al., "Interactive Scaling Control Mechanism for World–Wide Web Systems," Computer Networks and ISDN Systems 29, pp. 1467–1477, 1997.

* cited by examiner

Primary Examiner—Bipin Shalwala
Assistant Examiner—Daud L. Lewis
(74) Attorney, Agent, or Firm—Ronald L. Drumheller

(57) ABSTRACT

To make window systems which are widely used in personal computers and applications for personal computers operable in a portable information terminal which does not have a sufficient processing capability, input information such as a key input from operator generated in a portable information terminal 210 is sent to a remote supporting server 240 where it executes or simulates an arbitrary window system which is free from restriction of functions to generate a rendering image. The supporting server then converts the rendering image to an image suitable to the portable information terminal and sends it back to the portable information terminal 210 as a rendering instruction. The portable information terminal 210 receives the rendering instruction of this optimized image for display.

14 Claims, 16 Drawing Sheets

[Figure 2]
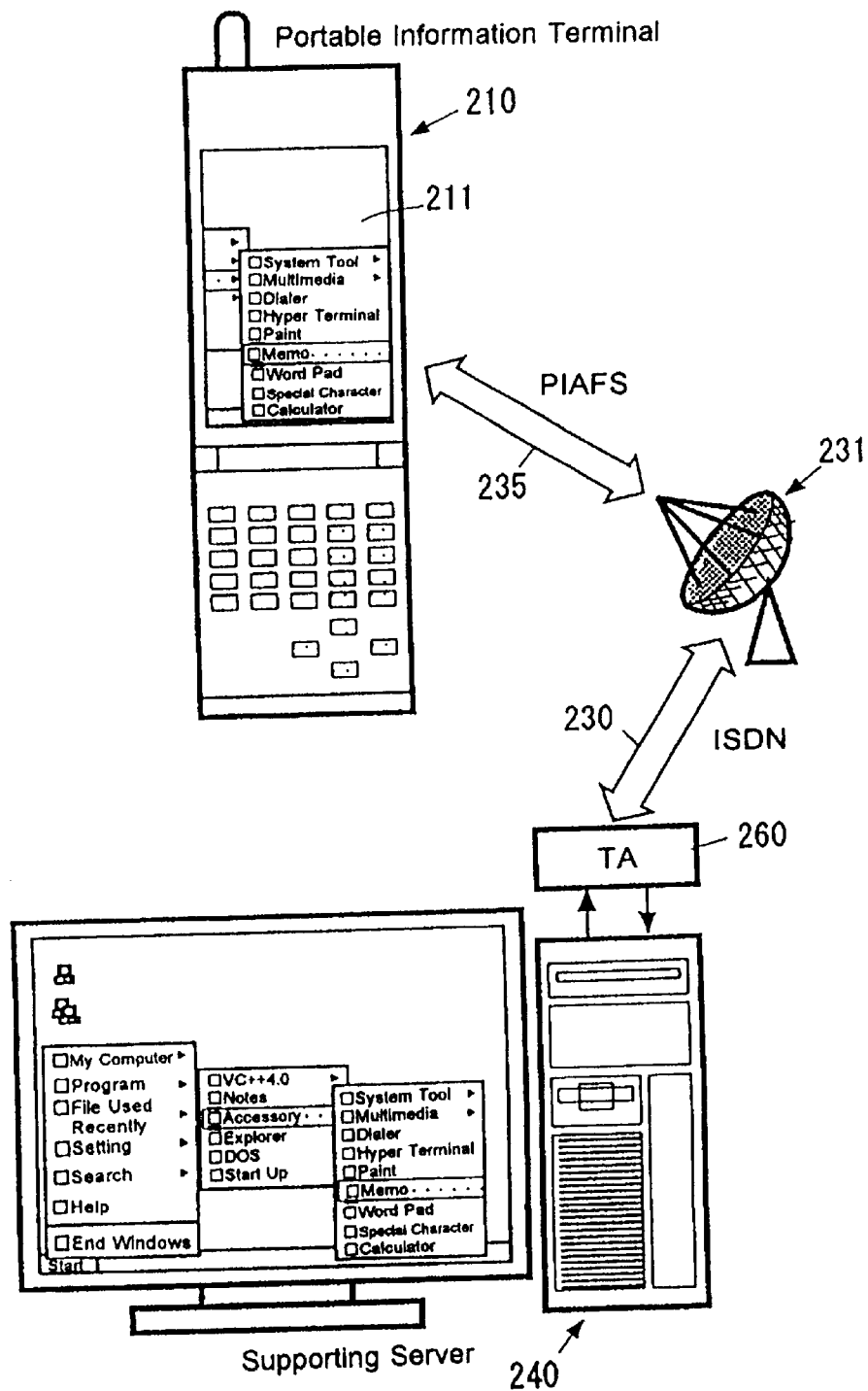

[Figure 3]
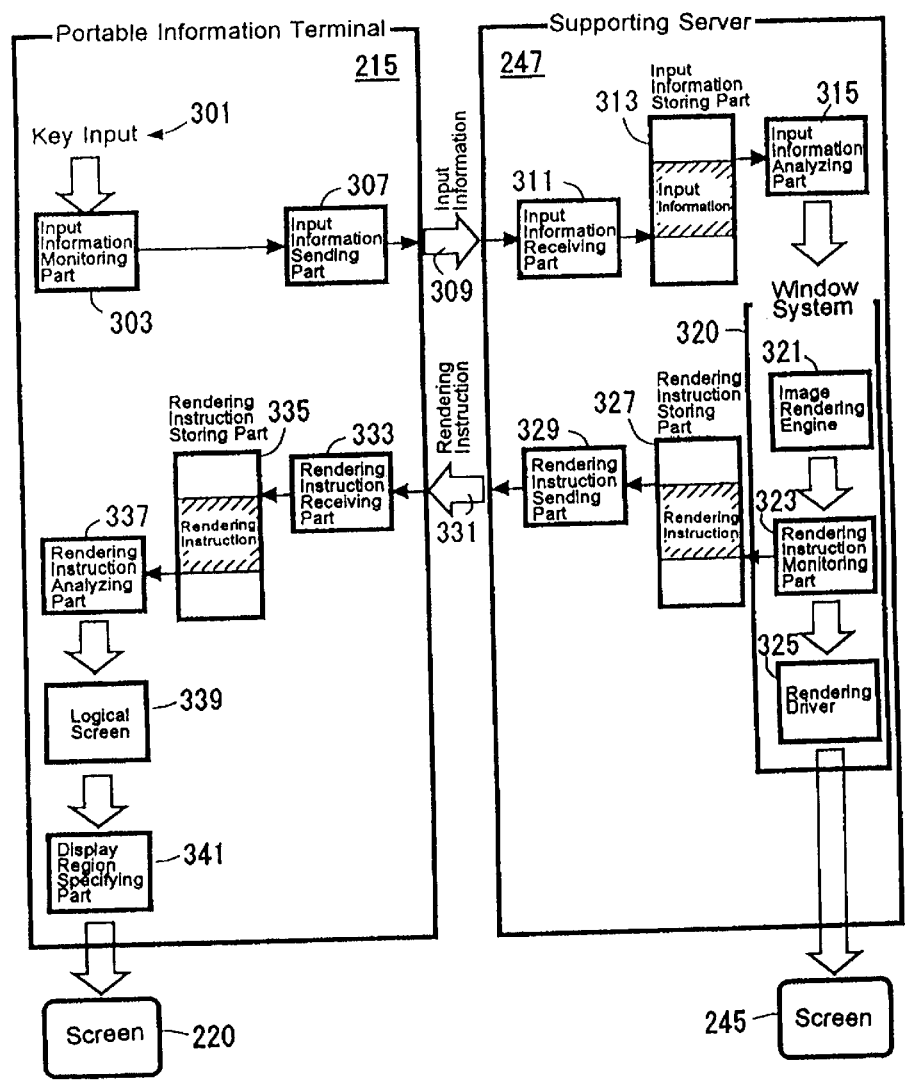

[Figure 4]
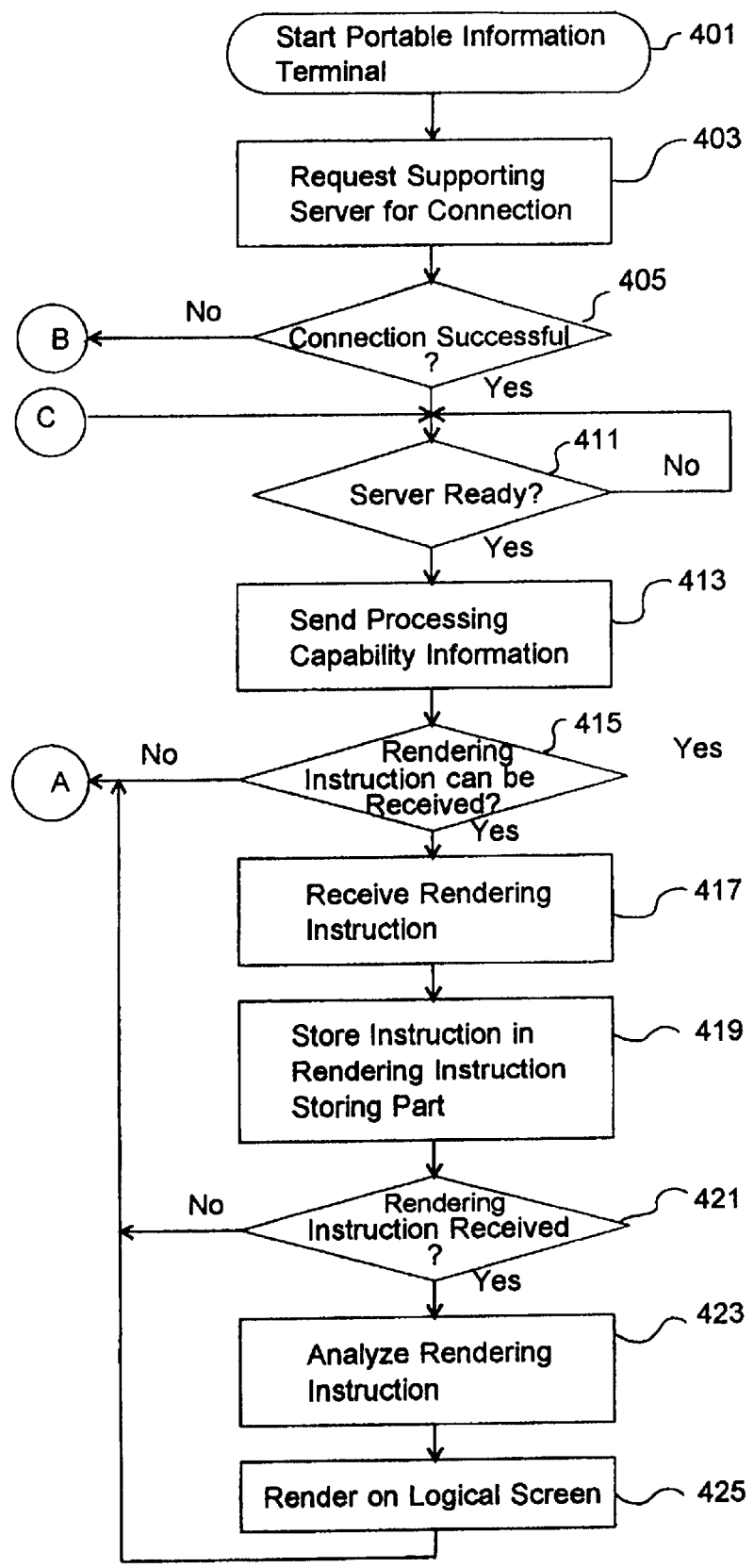

[Figure 5]
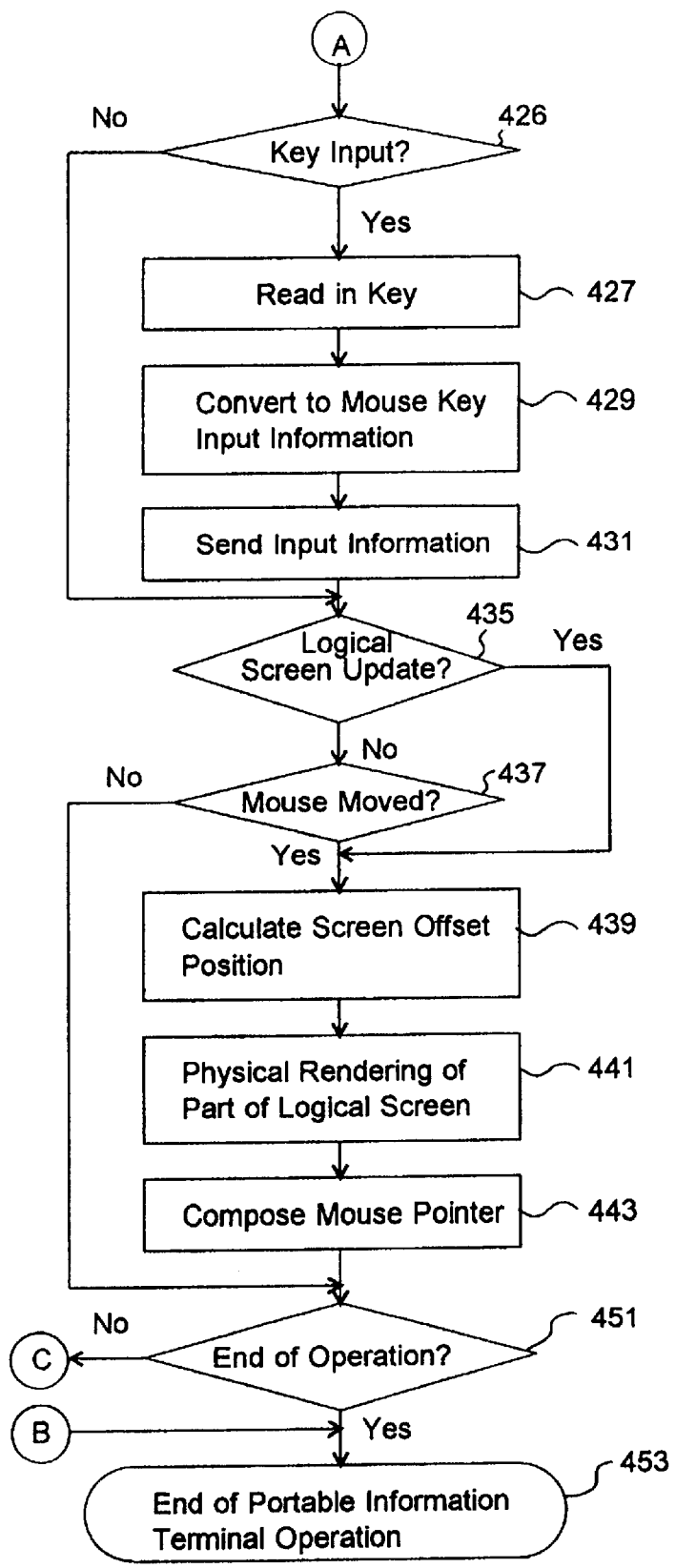

[Figure 6]
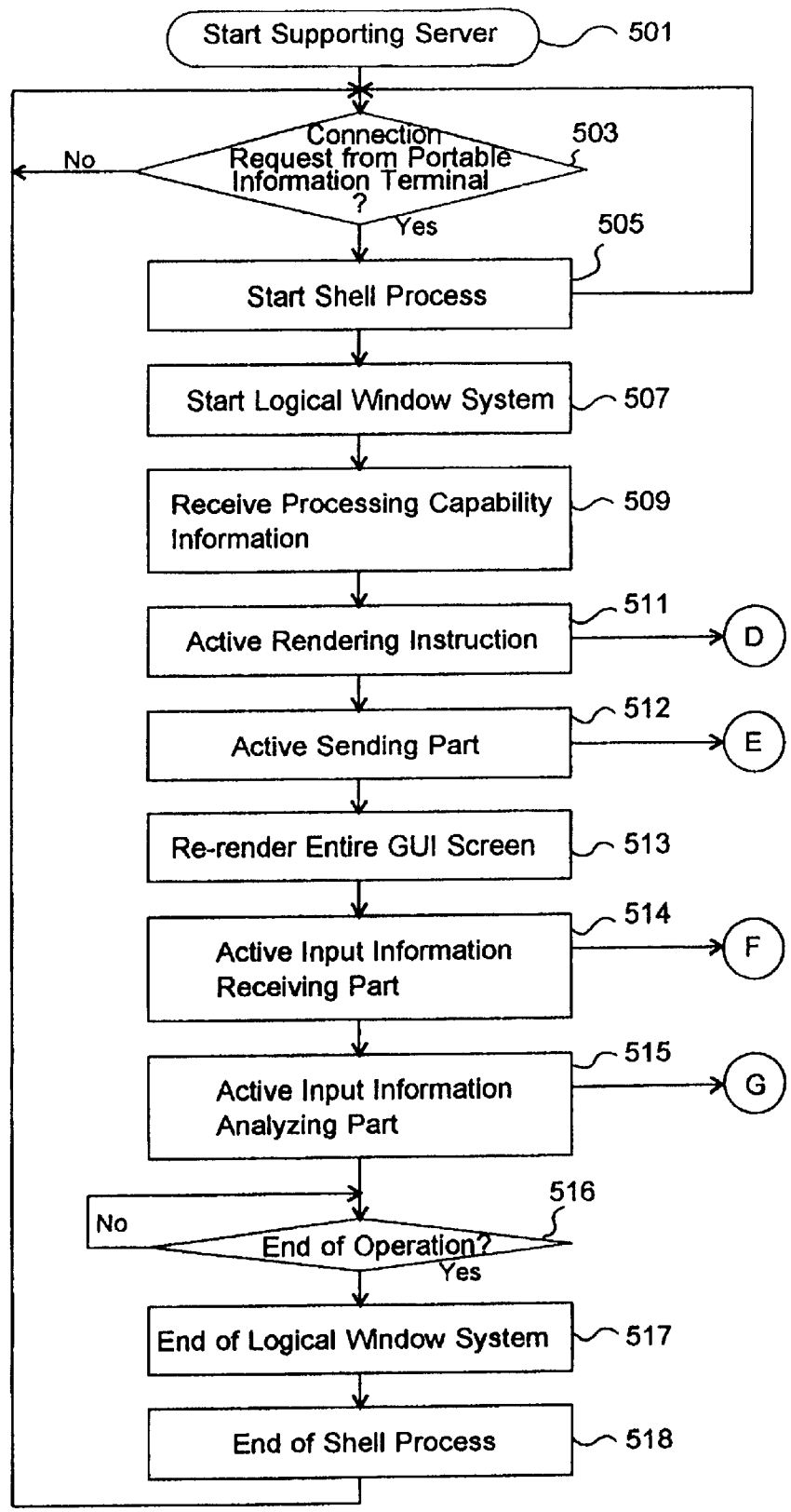

[Figure 7]
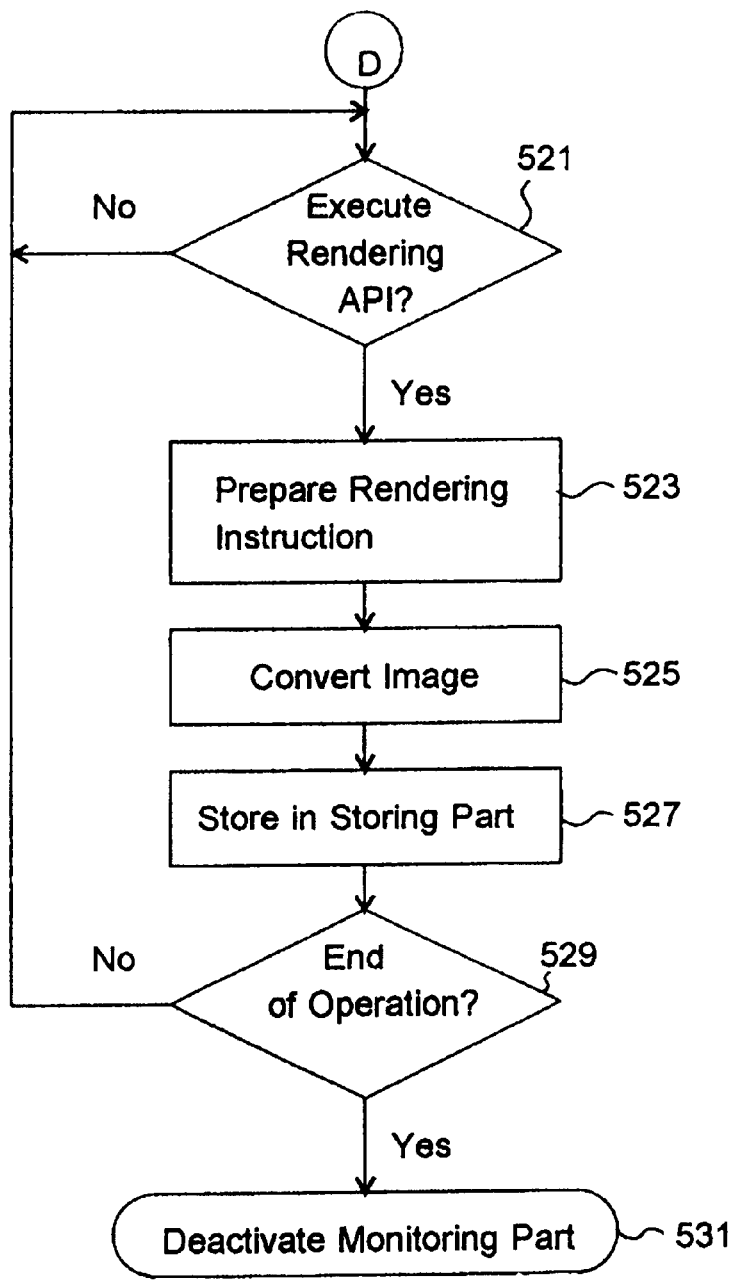

[Figure 8]
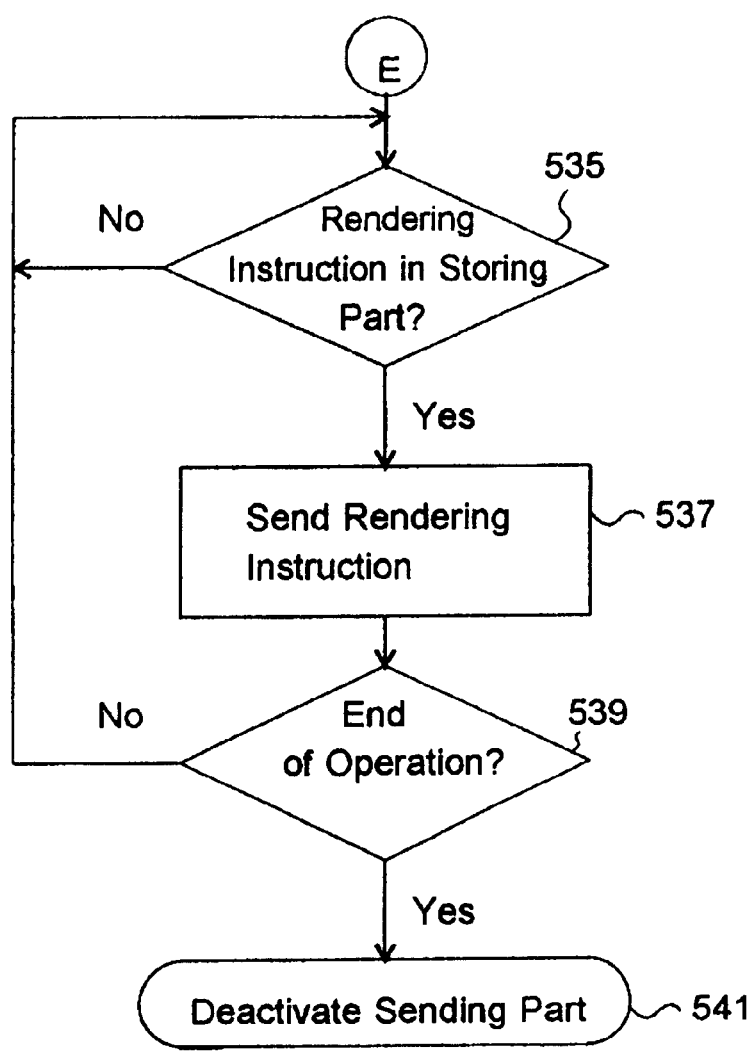

[Figure 9]
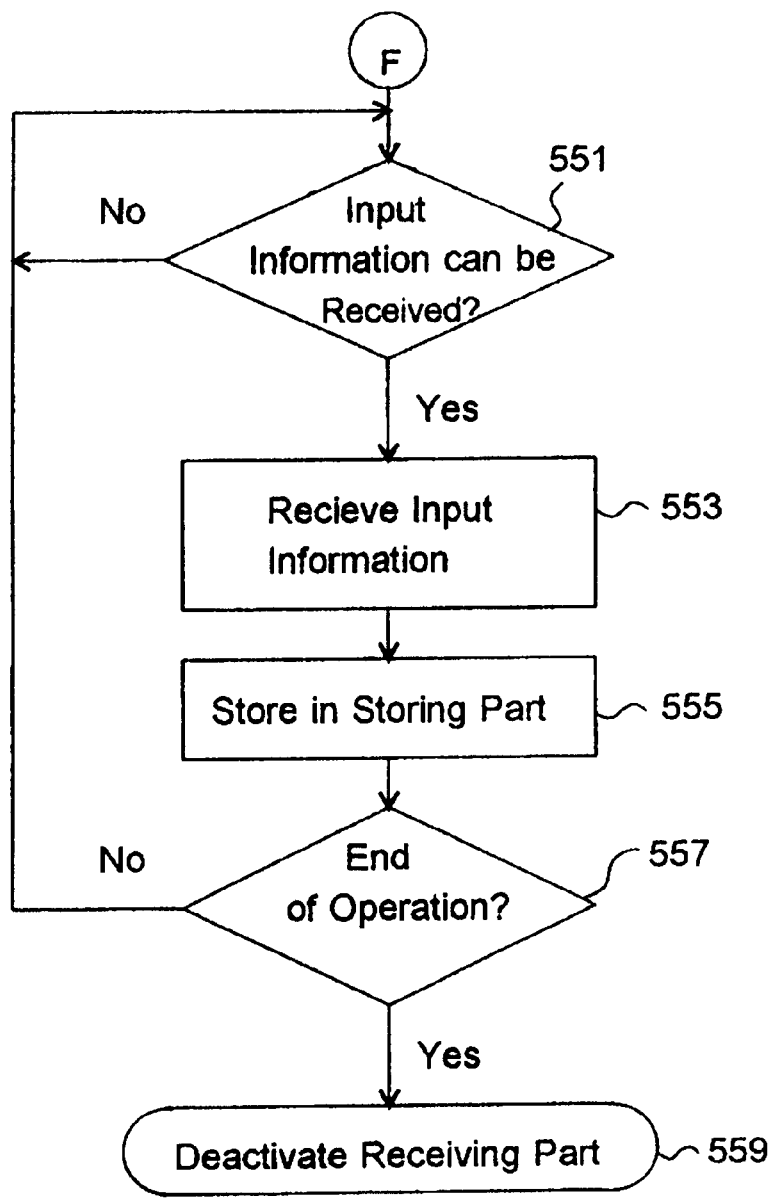

[Figure 10]
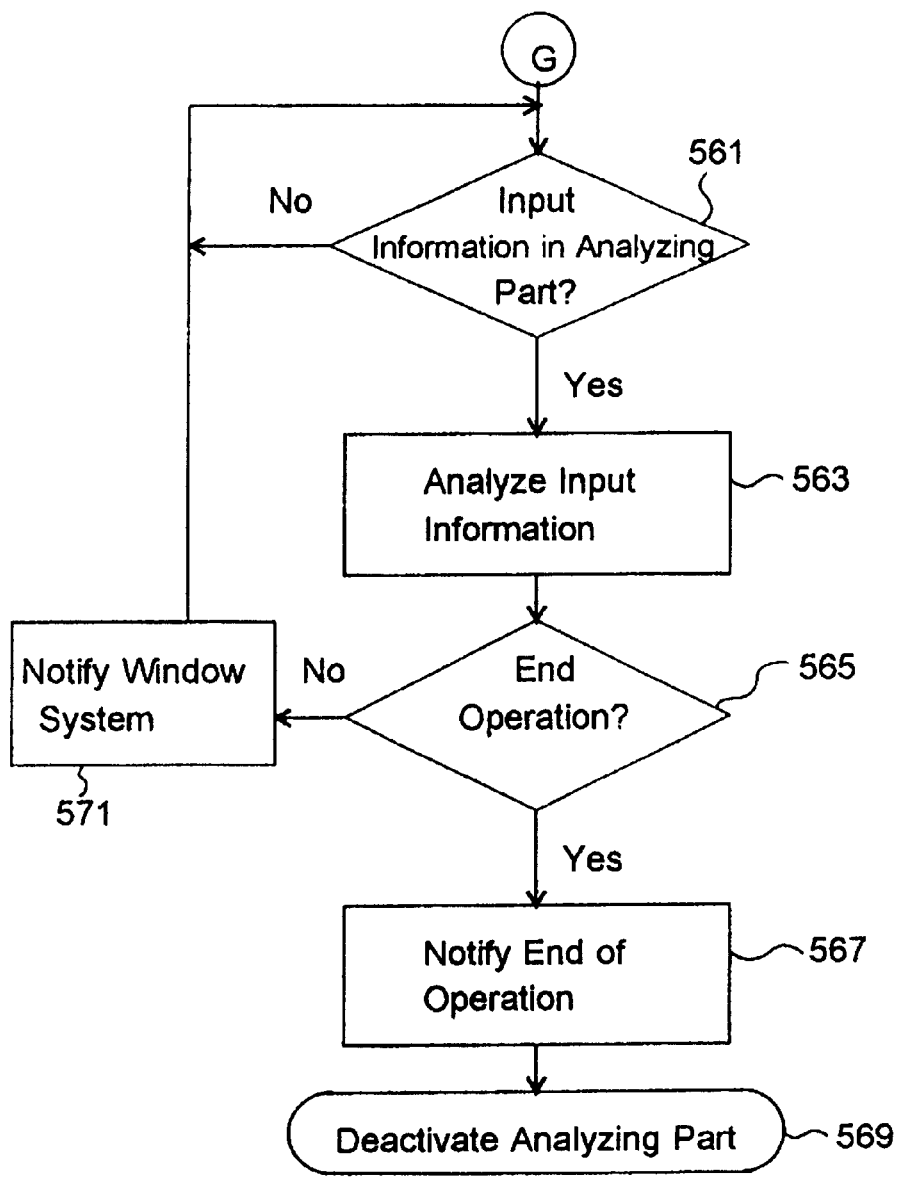

[Figure 11]
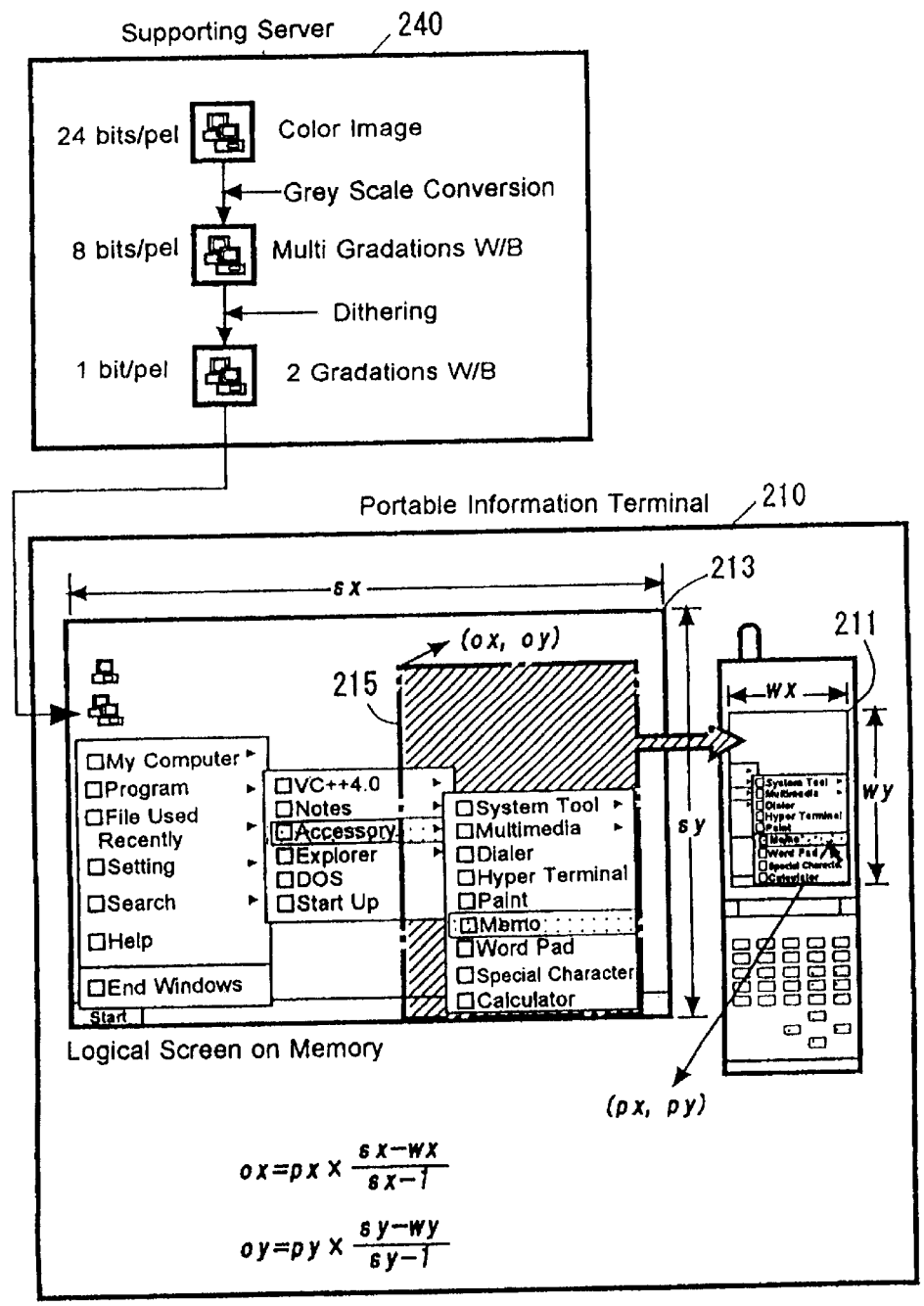

[Figure 12]
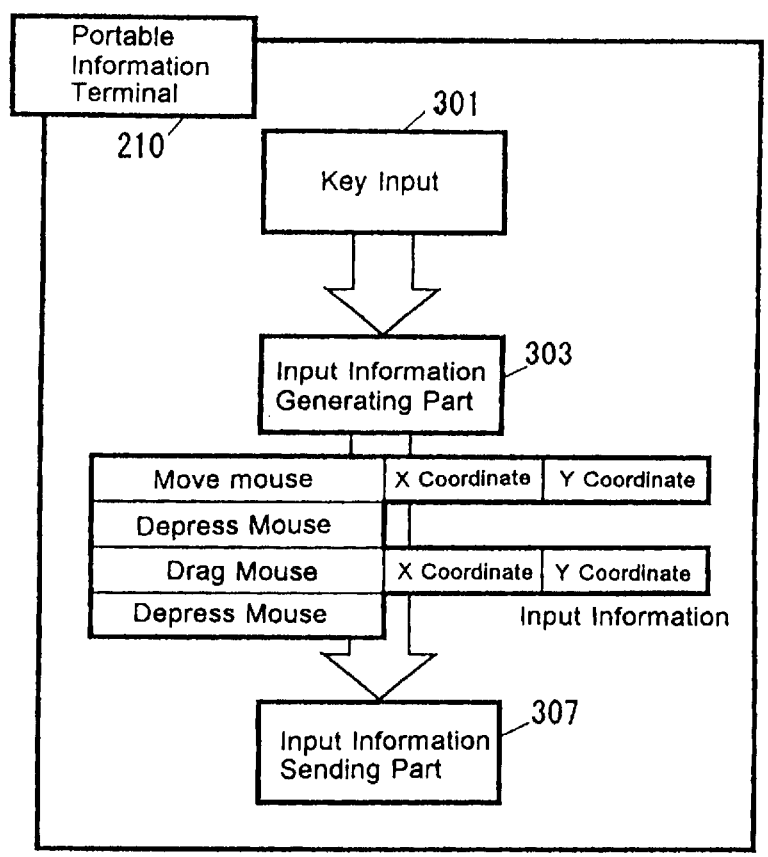

[Figure 13]
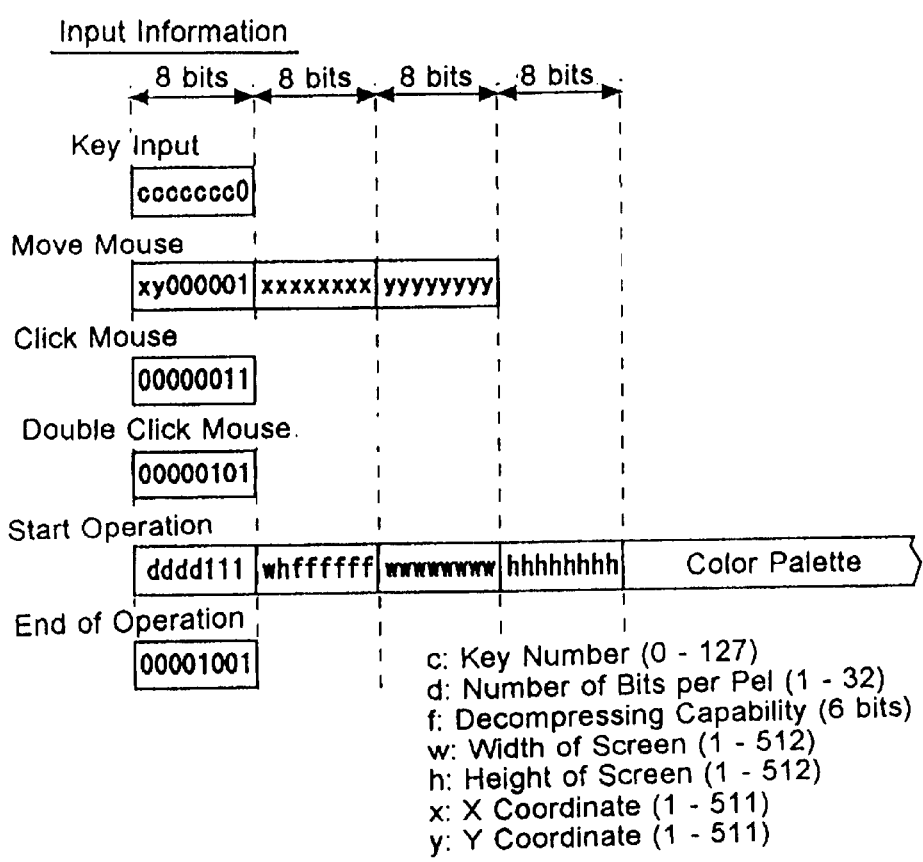

[Figure 14]
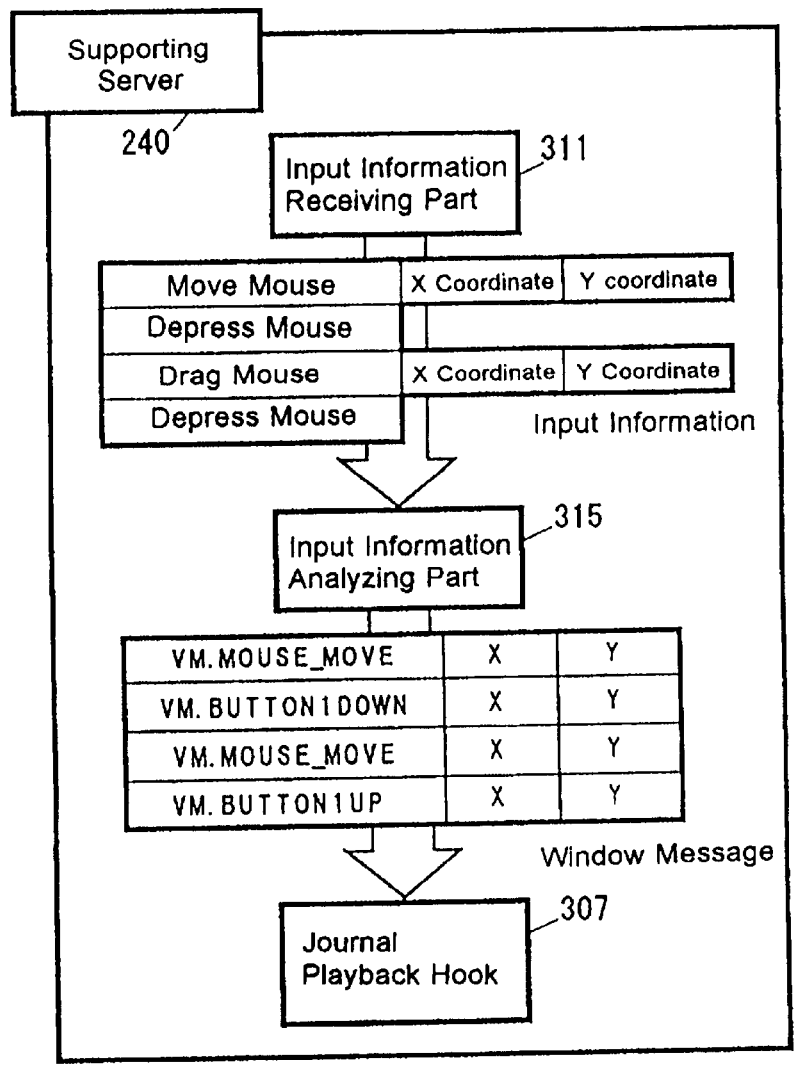

[Figure 15]
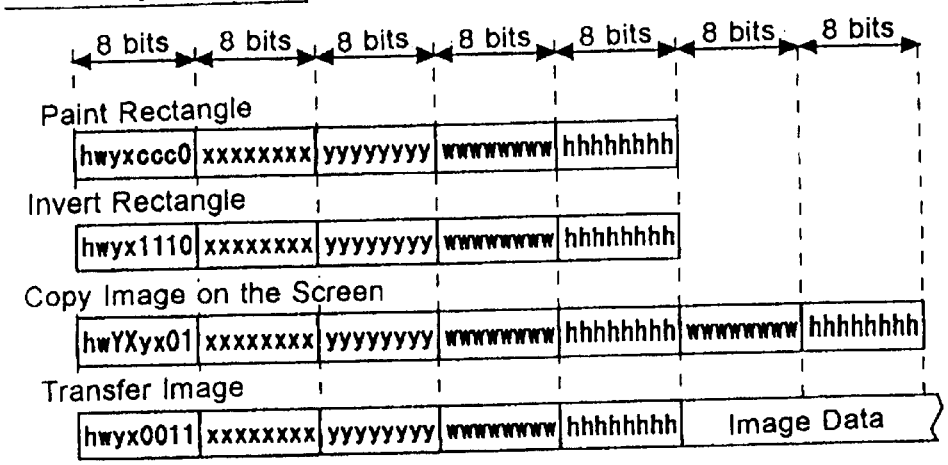

[Figure 16]

> Grey Scale Conversion
> (from Color Image to Multi Gradations of W/B Image)

W/B Density (8 bits) = R (8 bits) × 0.3
+ G (8 bits) × 0.6
+ B (8 bits) × 0.1

[Figure 17]

> Dithering
> (from Multi Gradation of W/B Image to 2 Gradations of W/B Image)

2 Gradations Density = 1 When the Value of Element Corresponding to
Pel Position in Dither Array is less than W/B Density of Pel,
Otherwise 2 Color Gradations Density = 0

Residue from Division of X Coordinate of Pel by 4

Residue from Division of Y Coordinate of Pel by 4

|   | 0 | 1 | 2 | 3 |
|---|---|---|---|---|
| 0 | 0 | 128 | 32 | 20 |
| 1 | 192 | 64 | 224 | 96 |
| 2 | 48 | 176 | 16 | 144 |
| 3 | 240 | 112 | 208 | 80 |

Dither Array

REMOTE CONTROL METHOD, SERVER AND RECORDING MEDIUM

BACKGROUND OF THE INVENTION

1. Field of the Invention

This invention relates to a remote control method and, in particular, to an improved remote control method in which resources required for a machine to be remote controlled are reduced.

2. Related Art

An OS (Operating System) providing a GUI (Graphic User Interface) and capable of file processing has been so far operable on a portable terminal such as a notebook PC.

However, a certain degree of machine power was required for a portable terminal in order to run such OS. For example, Windows 95 (Windows 95 is a trademark of Microsoft) requires provision of a CPU which is equal to or above i486SX, a memory larger than 8MB, a hard disk larger than 75 MB and a video display adapter having a resolution above the VGA.

On the other hand, a portable terminal, such as a smartphone, which has a small memory capacity and is provided only with a telephone function and an output function of a simple display, etc., including "Datascope" of Kyocera and "Pinocchio" of Panasonic, can only operate a special chip OS and can not use a general purpose OS.

There have been several operating systems, such as the above chip OS, specialized for and operable solely on a portable information terminal. However, they are accompanied with a problem that the function is limited due to the limited machine power, memory capacity and display capability and they are unable to execute a high level application which is operable on a general purpose OS as used in conventional PC's.

On the other hand, a portable terminal which can operate a general purpose OS involves a problem that down-sizing would involve many restrictions and the cost would be increased.

Further, because the window system of the portable information terminal is specialized to such terminal, an application has to be often designed and developed solely for such window system and an application used in home or office can not be used in such terminal.

In addition, while a portable information terminal is often carried along in a brief case, etc., by its nature, a danger was accompanied in which important data was lost by accident because data of an application specialized for such portable information terminal is stored in a memory of such terminal.

SUMMARY OF THE INVENTION

It is an object of this invention to provide a system which is capable of executing a general purpose OS as used in a conventional PC and a high level application operating on such OS in a machine having limited resources.

It is one of other objects in one mode of this invention to provide a small sized portable terminal which can provide a high function with a low cost.

It is one of other objects in one mode of this invention to provide a portable information terminal which can execute an application used in home and office, etc.

It is one of other objects in one mode of this invention to provide a portable information terminal which has a low probability of losing data.

It is one of other objects in one mode of this invention to reduce the work of installing remote control software at the remote controlling terminal for enabling a consolidated control of a system.

It is one of other objects in one mode of this invention to provide a system which is not affected by the type of a remote controlling terminal for realizing a common operability.

It is one of other objects in one mode of this invention to reduce the usage of resources of a remote controlling terminal for reducing the hardware requirement to enable a general purpose OS and a general purpose application to be used.

It is one of other objects in one mode of this invention to provide a high speed remote control system which reduces the volume of communication data between a remote controlling machine and a remote controlled machine in remote control operation.

It is one of other objects in one mode of this invention to provide a remote control system which can transmit data in an optimum form to a remote controlling machine in remote control operation.

It is one of other objects in one mode of this invention to provide a remote control system which can simultaneously support a plurality of remote controlling machines in remote control operation.

Input information, such as a key input from an operator generated in a remote controlling machine is transmitted to a remote location supporting server which executes or simulates an arbitrary window system which is free from restriction of function to generate a rendering image. The supporting server then converts the rendering image to an image which is suitable to the remote controlling machine and returns it to the remote controlling machine as a rendering instruction. The remote controlling machine receives the rendering instruction of this optimized image and displays it.

Because this window system actually operates on the supporting server, a window system which is widely used in personal computers, etc., may be used as it is and also an application for personal computers may be used as it is.

In one mode of this invention, a plurality of remote controlling machines can be simultaneously supported and, in response to a processing capability specifying information transmitted from an individual remote controlling machine, a rendering instruction is transmitted after conversion to a form which is optimum to each individual remote controlling machine.

In one of other modes of this invention, a method is provided for remote controlling resources retained by a server existing on a network from a terminal which has an input device and a display device, comprising the steps of;

(a) accessing said server via said network, (b) transmitting a signal generated from the input device of said terminal to said server as input information (c) receiving in said server side the input information transmitted from said terminal side and analyzing the content of the input information, (d) generating first rendering image data consisting of a first number of bits per picture element, (e) converting said first rendering image data t second rendering image data consisting of a second number of bits per picture element less than the first number of bits, (f) transmitting a rendering instruction including said second rendering image from said server side to said terminal side, (g) analyzing the rendering instruction transmitted from the server side on said terminal side, and
(h) generating image data to be displayed in a display screen of said terminal according to the content of the anal zed rendering instruction.

In one of other modes of this invention, a method is provided for remote controlling resources retained by a server existing on a network from a terminal which has an input device and a display device, comprising the steps of;
(a) transmitting a connection request from a first terminal of said plurality of terminals to said server via said network,
(b) starting a shell process in said server in response to the connection request from said first terminal,
(c) transmitting processing capability specifying information from said first terminal to said server,
(d) transmitting a signal generated from an input device of said first terminal to said server as input information,
(e) receiving the input information transmitted from said terminal side in said server side and analyzing the content of the input information,
(f) generating first rendering image data based on the content of the analyzed input information,
(g) converting said first rendering image data to second rendering image data according to said processing capability specifying information,
(h) transmitting a rendering instruction including said second rendering image from said server side to said terminal side,
(i) analyzing the rendering instruction transmitted from the server side in said terminal side,
(j) generating image data to be displayed in a display screen of said terminal according to the content of the analyzed rendering instruction.

In one of other modes of this invention, a method is provided for remote controlling resources retained by a server existing on a network from a terminal which has an input device and a display device, comprising the steps of;
(a) receiving the input information transmitted from said terminal side,
(b) analyzing the input information,
(c) generating first rendering image data consisting of a first number of bits per picture element based on the content of the analyzed input information,
(d) converting said first rendering image data to second rendering image data consisting of a second number of bits per picture element less than the first number of bits,
(e) transmitting a rendering instruction including said second rendering image from said server side to said terminal side.

In one of other modes of this invention, a method is provided for remote controlling resources retained by a server existing on a network from a terminal which has an input device and a display device, comprising the steps of;
(a) starting a shell process in response to a connection request from a first terminal of said plurality of terminals,
(b) receiving input information transmitted from said terminal side,
(c) analyzing the input information,
(d) generating first rendering image data consisting of a first number of bits per picture element based on the content of the analyzed input information,
(e) converting said first rendering image data to second rendering image data consisting of a second number of bits per picture element less than the first number of bits,
(f) transmitting a rendering instruction including said second rendering image from said server side to said terminal side.

In one of other modes of this invention, a method is provided for remote controlling resources retained by a server existing on a network from a terminal which has an input device and a display device, comprising the steps of;
(a) receiving a processing capability specifying information transmitted from said terminal,
(b) receiving input information transmitted from said terminal,
(c) analyzing the input information transmitted from said terminal,
(d) generating first rendering image data based on the content of the analyzed input information,
(e) converting said first rendering image data to second rendering image data according to said processing capability specifying information,
(f) transmitting a rendering instruction including said second rendering image from said server side to said terminal side.

In one of other modes of this invention, the processing capability specifying information is either one of;
(a) maximum resolution information of a logical screen,
(b) maximum resolution information of a physical screen,
(c) bits per picture element information,
(d) color palette information,
(e) compression/decompression capability information, of said terminal.

In one of other modes of this invention, a method is provided for remote controlling resources retained by a server existing on a network from a terminal which has an input device and a display device, comprising the steps of;
(a) starting a shell process in response to a connection request from a first terminal of said plurality of terminals,
(b) receiving processing capability specifying information transmitted from said terminal side,
(c) receiving input information transmitted from said terminal side,
(d) analyzing the input information,
(e) generating first rendering image data based on the content of the analyzed input information,
(f) converting said first rendering image data to second rendering image data according to said processing capability specifying information,
(g) transmitting a rendering instruction including said second rendering image from said server side to said terminal side.

In one of other modes of this invention, a system is provided which comprises a server existing on a network, and a terminal having an input device and a display device capable of remote controlling resources of said server retained by said server, comprising;
(a) a terminal;
(a-1) accessing said server via said network,
(a-2) transmitting a signal generated from the input device of said terminal to said server as input information,
(a-3) analyzing a rendering instruction transmitted from the server side, (a-4) generating image data to be displayed in a display screen of said terminal according to the content of the analyzed rendering instruction, and (b) a server;

(b-1) receiving input information transmitted from said terminal side and analyzing the content of the input information, (b-2) generating first rendering image data consisting of a first number of bits per picture element based on the content of the analyzed input information, (b-3) converting said first rendering image data to second rendering image data consisting of a second number of bits per picture element less than the first number of bits, (b-4) transmitting a rendering instruction including said second rendering image from said server side to said terminal side.

In one of other modes of this invention, a system is provided which comprises a server existing on a network, and a plurality of terminals having an input device and a display device capable of remote controlling resources of said server retained by said server, comprising;

(a) a plurality of terminals;

(a-1) transmitting a connection request to said server via said network, (a-2) transmitting processing capability specifying information to said server, (a-3) transmitting a signal generated from the input device to said server as input information, (a-4) analyzing a rendering instruction transmitted from the server side, (a-5) generating image data to be displayed in a display screen according to the content of the analyzed rendering instruction, and (b) a server;

(b-1) starting a shell process in response to a connection request from the terminal side, (b-2) receiving input information transmitted from said terminal side and analyzing the content of the input information, (b-3) generating first rendering image data based on the content of the analyzed input information, (b-4) converting said first rendering image data to second rendering image data according to said processing capability specifying information, (b-5) transmitting a rendering instruction including said second rendering image from said server side to said terminal side.

In one of other modes of this invention, a server is provided which exists on a network and is remote controlled from a terminal which has an input device and a display device, comprising;

(a) an input information receiving part for receiving input information transmitted from said terminal side, (b) an input information analyzing part for analyzing the input information, (c) an image rendering engine for generating first rendering image data consisting of a first number of bits per picture element based on the content of the analyzed input information, (d) a rendering instruction monitoring part for converting said first rendering image data to second rendering image data consisting of a second number of bits per picture element less than the first number of bits, (e) a rendering instruction transmitting part for transmitting a rendering instruction including said second rendering image from said server side to said terminal side.

In one of other modes of this invention, a server is provided which exists on a network and is remote controlled from a terminal which has an input device and a display device, comprising;

(a) an input information receiving part;

(a-1) starting a shell process in response to a connection request from a first terminal of said plurality of terminals and, (a-2) receiving input information transmitted from said first terminal, (b) an input information analyzing part for analyzing the input information, (c) an image rendering engine for generating first rendering image data consisting of a first number of bits per picture element based on the content of the analyzed input information, (d) a rendering instruction monitoring part for converting said first rendering image data to second rendering image data consisting of a second number of bits per picture element less than the first number of bits, (e) a rendering instruction transmitting part for transmitting a rendering instruction including said second rendering image from said server side to said terminal side.

In one of other modes of this invention, a server is provided which exists on a network and is remote controlled from a terminal which has an input device and a display device, comprising;

(a) an input information receiving part;

(a-1) receiving processing capability specifying information transmitted from said terminal, and (a-2) receiving input information transmitted from said first terminal, (b) an input information analyzing part for analyzing the input information, (c) an image rendering engine for generating first rendering image data based on the content of the analyzed input information, (d) a rendering instruction monitoring part for converting said first rendering image data to second rendering image data according to said processing capability specifying information, (e) a rendering instruction transmitting part for transmitting a rendering instruction including said second rendering image from said server side to said terminal side.

In one of other modes of this invention, a server is provided which exists on a network and is remote controlled from a terminal which has an input device and a display device, comprising;

(a) an input information receiving part;

(a-1) starting a shell process in response to a connection request from a first terminal of said plurality of terminals and, (a-2) receiving processing capability specifying information transmitted from said first terminal, (a-3) receiving input information transmitted from said first terminal, (b) an input information analyzing part for analyzing the input information, (c) an image rendering engine for generating first rendering image data based on the content of the analyzed input information, (d) a rendering instruction monitoring part for converting said first rendering image data to second rendering image data according to said processing capability specifying information, (e) a rendering instruction transmitting part for transmitting a rendering instruction including said second rendering image from said server side to said first terminal side.

In one of other modes of this invention, a recording medium is provided which stores therein a remote controlled program executed by said server for remote controlling resources retained by a server existing on a network from a terminal which has an input device and a display device, comprising;

(a) a program code instructing said server to receive input information transmitted from said terminal side, (b) a program code instructing said server to analyze the input information, (c) a program code instructing said server to generate first rendering image data consisting of a first number of bits per picture element, (d) a program code instructing said server to convert said first rendering image data to second rendering image data consisting of a second number of bits per picture element less than the first number of bits, (e) a program code instructing said server to transmit a rendering instruction including said second rendering image from said server side to said terminal side.

In one of other modes of this invention, a recording medium is provided which stores therein a remote controlled program executed by said server for remote controlling resources retained by a server existing on a network from a terminal which has an input device and a display device, comprising;

(a) a program code instructing said server to start a shell process in response to a connection request from a first terminal of said plurality of terminals, (b) a program code instructing said server to receive input information transmitted from said first terminal side, (c) a program code instructing said server to analyze the input information, (d) a program code instructing said server to generate first rendering image data consisting of a first number of bits per picture element based on the content of the analyzed input information, (e) a program code instructing said server to convert said first rendering image data to second rendering image data consisting of a second number of bits per picture element less than the first number of bits, (f) a program code instructing said server to transmit a rendering instruction including said second rendering image from said server side to said first terminal side.

In one of other modes of this invention, a recording medium is provided which stores therein a remote controlled program executed by said server for remote controlling resources retained by a server existing on a network from a terminal which has an input device and a display device, comprising;

(a) a program code instructing said server to receive processing capability specifying information transmitted from said terminal, (b) a program code instructing said server to receive input information transmitted from said terminal, (c) a program code instructing said server to analyze the input information, (d) a program code instructing said server to generate first rendering image data based on the content of the analyzed input information, (e) a program code instructing said server to convert said first rendering image data to second rendering image data according to said processing capability specifying information, (f) a program code instructing said server to transmit a rendering instruction including said second rendering image from said server side to said first terminal side.

In one of other modes of this invention, a recording medium is provided which stores therein a remote controlled program executed by said server for remote controlling resources retained by a server existing on a network from a terminal which has an input device and a display device, comprising;

(a) a program code instructing said server to start a shell process in response to a connection request from a first terminal of said plurality of terminals, (b) a program code instructing said server to receive processing capability specifying information transmitted from said first terminal, (c) a program code instructing said server to receive input information transmitted from said first terminal, (d) a program code instructing said server to analyze the input information, (e) a program code instructing said server to generate first rendering image data based on the content of the analyzed input information, (f) a program code instructing said server to convert said first rendering image data to second rendering image data according to said processing capability specifying information, (g) a program code instructing said server to transmit a rendering instruction including said second rendering image from said server side to said first terminal side.

In one of other modes of this invention, a method is provided for specifying a display region of a size of (wx, wy) to be displayed on a display screen from image data constituting a logical screen having a size of (sx, sy) stored in a portable information terminal, characterized in that the region of the size of (wx, wy) is specified as a display region starting from a starting point which is defined as;

$$ox=px(sx-wx)/((sx-1)$$

$$oy=py(sy-wy)/(sy-1)$$

where (px, py) is a coordinate position of a mouse pointer of the portable information terminal.

BRIEF DESCRIPTION OF THE DRAWINGS

FIG. 2 is a diagram showing an embodiment of this invention in operational condition.

FIG. 3 is a block diagram showing the structure of a portable information terminal and a supporting server in a preferred embodiment of this invention.

FIG. 4 is a flow chart showing the operational condition of a portable information terminal in a preferred embodiment of this invention.

FIG. 5 is a flow chart showing the operational condition of a portable information terminal in a preferred embodiment of this invention.

FIG. 6 is a flow chart showing the operational condition of a supporting server in a preferred embodiment of this invention.

FIG. 7 is a flow chart showing the operational condition of a supporting server in a preferred embodiment of this invention.

FIG. 8 is a flow chart showing the operational condition of a supporting server in a preferred embodiment of this invention.

FIG. 9 is a flow chart showing the operational condition of a supporting server in a preferred embodiment of this invention.

FIG. 10 is a flow chart showing the operational condition of a supporting server in a preferred embodiment of this invention.

FIG. 11 is a schematic diagram showing the operational condition of a portable information terminal and a supporting server in a preferred embodiment of this invention.

FIG. 12 is a diagram showing an embodiment of data conversion performed by an input information generating part in a preferred embodiment of this invention.

FIG. 13 is a diagram showing an embodiment of input information and data in a preferred embodiment of this invention.

FIG. 14 is a diagram showing an embodiment of data conversion performed by an input information analyzing part in a preferred embodiment of this invention.

FIG. 15 is a diagram showing an embodiment of a rendering instruction data in a preferred embodiment of this invention.

FIG. 16 is a diagram showing an example of image conversion in a preferred embodiment of this invention.

FIG. 17 is a diagram showing an example of image conversion in a preferred embodiment of this invention.

DESCRIPTION OF THE PREFERRED EMBODIMENTS

Figure 1:
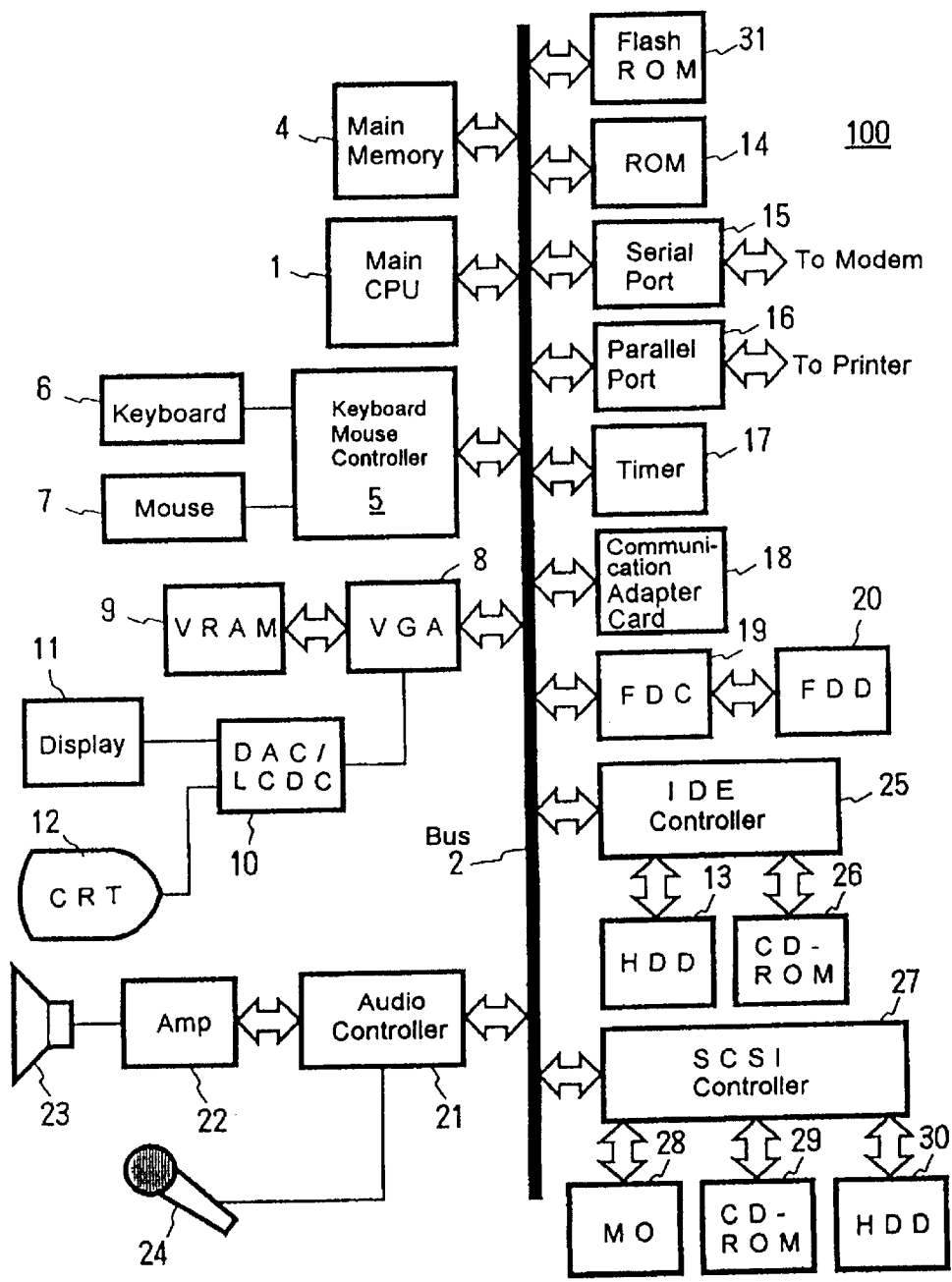
FIG. 1 is a block diagram of an embodiment of the hardware configuration of a remote control machine or a supporting server.

An embodiment of this invention is now described with reference to the drawings hereunder. Referring to FIG. 1, an embodiment of a hardware configuration of a remote controlling machine (portable information terminal 210) as used in this invention is schematically shown. A remote controlling machine 100 comprises a central processing unit (CPU) 1 and a memory 4. The CPU 1 and the memory 4 are connected to a hard disk device 13, an auxiliary memory device, (or a flash ROM 31) via a bus 2. A floppy disk device (or a recording medium such as MO, CD-ROM 23, etc.) 20 is connected to the bus 2 via a floppy disk controller 19.

A floppy disk (or a recording medium such as MO, CD-ROM, etc.) is inserted in the floppy disk device (or a recording medium drive device such as MO, CD-ROM, etc.) 20. The floppy disk, a hard disk device 13 (or a recording medium such as MO, CD-ROM 23, DVD) and a ROM 14 may record therein a computer program code for providing instructions to the CPU 1 in cooperation with an operating system to practice this invention, which instructions are executed by being loaded in the memory 4. The computer program may be compressed or divided into a plurality of pieces for recording in a plurality of media.

The remote controlling machine 210 may be further provided with a user interface hardware and have a pointing device (mouse, track ball and joystick, etc.) 7, a keyboard 6 and a display 12 for presenting vidual data to the user. It is also possible to connect a printer via a parallel port 16 and a modem via a serial port 15. The remote controlling machine 210 can be connected to a network via a serial port 15 and a modem or via a communication adapter 18 (Ethernet and token ring) for communication with other computers.

A speaker 23 receives an audio signal which is D/A converted (digital/analog conversion) by an audio controller 21 via an amplifier 22 to output as a voice. The audio controller 21 can also A/D convert voice information received from a microphone 24 to take in voice information external to the system into the system.

It will be readily understood that the remote controlling machine 210 of this invention can be practiced with a conventional personal computer (PC), a workstation, a notebook PC, a palm top PC, a network computer, various home electric appliances such as a television in which a computer is implemented, a game machine having a communication function, and a communication terminal having a communication function such as a telephone device, a facsimile device, a portable telephone device, a PHS and an electronic notebook, or a combination thereof. It should be understood that these components are exemplarily given and it is not meant that all these components are necessarily indispensable to this invention.

Particularly, as seen from the use of a smartphone, which has a telephone function, an output function of a display, etc., and a send/receive function of an electronic mail including "Datascope" of Kyocera and "Pinocchio" of Panasonic, as the remote controlling machine 210 in the preferred embodiment of this invention, the audio controller 21, the amplifier 22, the speaker 23 and the microphone 24 required for processing a voice, the keyboard 6, the mouse 7 and the keyboard/mouse controller 5 which enable a direct input from the operator, the CRT 12, the display device 11, the VRAM 9 and the VGA 8 for presenting visual data to the user, and various recording medium processing devices 19, 25, 27 are not necessarily required components. It is sufficient for the keyboard 6, the mouse 7 and the keyboard/mouse controller 5 to have input means for performing a remote operation practically.

Each component of the remote controlling machine 210 and various modifications including combining a plurality of machines and distributing functions to each to practice this invention should be readily obvious to those skilled in the art and such modifications are included in the concept of this invention.

The supporting server 240 used in this invention may be also implemented by the hardware configuration shown in FIG. 1 in the same manner as the remote controlling machine 210. In other words, it is also sufficient for the supporting server 240 to be provided with a function of receiving transmitted input information and converting it to a rendering instruction for sending, and a function of storing remote controlling and remote controlled softwares and sending the remote controlling software, so that it should be readily understood that the server 240 may be also implemented by a communication terminal having a communication function such as a conventional personal computer (PC), a workstation and a notebook PC, or a combination thereof.

However, these components are exemplarily given and it is not intended that all of those components are necessarily indispensable components of this invention. Particularly, because the hardware configuration described here is required for operating a remote server (supporting server), the audio controller 21, the amplifier 22, the speaker 23 and the microphone 24 required for processing a voice are not the indispensable components. Also, the keyboard 6, the mouse 7 and the keyboard/mouse controller 5 enabling direct input from the operator are not the indispensable components when the server is solely remote controlled.

The operating system in the side of the remote controlling machine 210 may be implemented by one which supports GUI multi-window environment as a standard, such as Windows NT (a trademark of Microsoft), Windows 95 (a trademark of Microsoft), Windows 3.x (a trademark of Microsoft), OS/2 ( a trademark of IBM), MacOS (a trademark of Apple), and X-WINDOW system (a trademark of MIT) on AIX (a trademark of IBM), one which is in character base environment, such as PC-DOS (a trademark of IBM) and MS-DOS ( a trademark of Microsoft), a real time OS, such as OS/Open (a trademark of IBM) and VxWorks(a trademark of Wind River Systems, Inc) and an OS which is installed in a network computer, such as JavaOS as well as a chip card OS as described in the above without being limited to any specific operating system environment.

The operating system in the supporting server side 240 may be implemented by one which supports GUI multi-window environment as a standard, such as Windows NT (a trademark of Microsoft), Windows 95 (a trademark of Microsoft), Windows 3.x (a trademark of Microsoft), OS/2 (a trademark of IBM), MacOS (a trademark of Apple), and X-WINDOW system (a trademark of MIT) on AIX (a trademark of IBM), a real time OS, such as OS/Open (a trademark of IBM) and VxWorks(a trademark of Wind River Systems, Inc) and an OS which is installed in a network computer, such as JavaOS without being limited to any specific operating system environment.

FIG. 2 is a diagram illustrating the operational condition of the system in a preferred embodiment of this invention. In this embodiment, the portable information terminal 210 has an access to the supporting server 240 by a PHS function.

A connection request is sent from the portable information terminal 210 to the supporting server 240. The supporting server 240 receives the connection request and notifies the portable information terminal 210 that it can be connected. FIG. 2 shows a state in which a remote controlling application on the portable information terminal 210 and a remote controlled application on the supporting server 240 has established a connection.

In the figure, "PIAFS" is an abbreviation of "PHS Internet Access Forum Standard" which is a communication method for a high speed wireless communication at 32 Kbps with PHS.

FIG. 3 is a functional block diagram explaining the system configuration of the portable information terminal 210 and the supporting server 240 in the preferred embodiment of this invention. In the figure, portable information terminal 210 side includes an input information monitoring part 303, an input information sending part 307, a rendering instruction receiving part 333, a rendering instruction storing part 335, a rendering instruction analyzing part 337 and a logical screen image data storing part 339.

On the other hand, the supporting server 240 side includes an input information receiving part 311, an input information storing part 313, an input information analyzing part 315, a window system 320, a rendering instruction storing part 327 and a rendering instruction sending part 329.

The input information generating part 303 generates input information to be described later based on a key input taking place by operating an input device such as a keyboard on the portable information terminal 210. The input information sending part 307 sends the input information to the supporting server 240.

The input information receiving part 311 receives input information transmitted from the portable information terminal 210 side and stores the input information in the input information storing part 313 in the supporting server 240 side to be described later. The input information storing part 313 temporarily stores input information to make the input information receiving part 311 and the input information analyzing part 315 independently operable.

The input information analyzing part 315 monitors the input information to be stored in the input information storing part 313 of the supporting server side and analyzes the input information stored in the input information storing part 313. The input information analyzing part 315 then converts it to a message (window message) in the form conforming to the window system installed in the supporting server 240 for delivery to the window system 320.

In the preferred embodiment of this invention, the window system includes a rendering instruction analyzing part 321, a rendering instruction monitoring part 323 and a rendering driver 325. Re-writing of the GUI screen caused by the window message is outputted as an image to a display device 245 by an image rendering engine 321 and the rendering driver 325 of the window system 320. The rendering instruction monitoring part 323 monitors all APIs called for re-writing the GUI screen of the supporting server, prepares a rendering instruction based on this, and performs a conversion processing of image data to be described later between the image rendering engine and the rendering driver. The rendering instruction monitoring part 323 also stores a rendering instruction including the converted image data in the rendering instruction storing part 327 of the supporting server 240 side.

The rendering instruction storing part 313 temporarily stores a rendering instruction to make the rendering instruction monitoring part 323 and the rendering instruction sending part 329 independently operable.

The rendering instruction sending part 329 monitors to see that a rendering instruction is stored in the rendering instruction storing part 327 and, when detecting that a rendering instruction is stored in the rendering instruction storing part 327, sends the rendering instruction to the portable information terminal 210 side.

The rendering instruction receiving part 333 monitors transmission of a rendering instruction from the supporting server and stores the received rendering instruction in the rendering instruction storing part 335 of the portable information terminal 210 side.

The rendering instruction analyzing part 337 monitors to see that a rendering instruction is stored in the rendering instruction storing part 335 and composes an image which is resulted from image conversion process to be described later applied to the image generated in the window system of the supporting server by analyzing the stored rendering instruction into a logical screen image of a bit map. By monitoring the change of the screen by a software timer or a window message hook and generating a rendering instruction from the difference, a similar system can be constructed though the operating speed is somehow sacrificed.

A display region specifying part 341 specifies a region in the screen 211 of the portable information terminal 210 from the logical screen image of the bit map for output to the display screen 211.

While each functional block shown in FIG. 3 has been described in the above, it is a logical functional block and is not meant to be implemented in the form of a discrete hardware or a software. It can be implemented by a shared hardware or software. Also, it is not meant that all functional blocks shown in FIG. 3 are indispensable components of this invention. For example, when the supporting server 240 is customized to support a remote controlling terminal, the rendering driver 325 or the display screen 245 is a component which is not needed in this invention because it does not have to perform screen display by itself.

Next, a procedure of the remote control in the preferred embodiment of this invention will be described with reference to the flow chart of FIG. 4 to 10 and a schematic diagram of FIG. 11 showing the operational condition of the portable information terminal 210 and the supporting server 240. FIG. 4 and FIG. 5 are flow chart showing the procedure of processing in the portable information terminal 210 side in the preferred embodiment of this invention.

The operator starts up the portable information terminal 210 (block 401) and sends out a connection request to the supporting server 240 using the PHS function of the portable information terminal 210 (block 403). When the connection is successful (block 405) and the supporting server 240 is ready (block 411), information indicating the processing capability of the portable information terminal is sent from the portable information terminal 210 to the supporting server 240 side (block 413). In the preferred embodiment of this invention, the processing capability information includes the resolution of the logical screen, the display capability of color image (number of bits information per picture element such as 256 colors, 16 colors and monochrome), color palette information and compression/decompression capability information, etc.

When the rendering instruction can be received (block 415), a rendering instruction of an initial screen is received from the supporting server 240 (block 417) and the received rendering instruction is stored in the rendering instruction storing part 335 of the portable information terminal 210 (block 419). When reception of the rendering instruction has been completed (block 421), the rendering instruction analyzing part 337 analyzes the rendering instruction stored in the rendering instruction storing part 335 and generates an image which is resulted from an image conversion applied to the image rendered on the GUI screen of the supporting server for rendering on the screen 211 of the portable information terminal 210 (block 425).

In the preferred embodiment of this invention, a certain region is cut out of the logical screen 213 on the memory as a display region for display as shown in FIG. 11. This will be described later in this specification.

The input information generating part 303 monitors input information taking place by a key input on the keyboard of the portable information terminal 210 (block 426) and converts the key input to a mouse key input (blocks 427, 429).

In the preferred embodiment of this invention, the signal generated by the key input is converted by the input information generating part 303 to input information such as the type of input information and the coordinate position where the input information is generated for delivery to the input information sending part 307 as shown in FIG. 12. A sample of input information in the preferred embodiment of this invention is shown in FIG. 13. The input information sending part 307 sends this input information to the supporting server 240 side. The input information may be sent to the supporting server 240 with compression or encryption and then decompressed or de-encrypted for use in the supporting server 240 side.

When the logical screen is updated or the mouse is moved in the logical screen (blocks 435, 437), the display region specifying part 341 calculates a screen offset position (block 439) and renders a part of the logical screen specified by the calculation in the display screen 211 (block 441). Also, the mouse pointers are composed (block 443).

In the preferred embodiment of this invention, the size of the region 215 to be cut out as a display region is determined from the size of the logical screen 213 on the memory, the size of the display screen 211 of the portable information terminal 210 and position information of the mouse pointer as shown in FIG. 11.

Specifically, by putting the start point (upper left coordinate position) of the cut out region 215 as (ox, oy), the size of the logical screen 213 on the memory as (sx, sy), the size of the display screen 211 of the portable information terminal 210 as (wx, wy) and the coordinate position of the mouse pointer as (px, py), ox and oy are determined by:

$$ox=px(sx-wx)/(sx-1)$$

$$oy=py(sy-wy)/(sy-1)$$

and a region (wx, wy) having start points ox and oy is determined to be a cut out region 215. However, this is a mere example and the position of the mouse pointer may be always at the center (excluding the periphery) of the display screen.

In this case, ox and oy are determined by:

$$ox=px-wx/2$$

$$oy=py-wy/2$$

(provided ox=0 when ox<0

$$ox=sx-wx \text{ when } ox>sx-wx$$

$$oy=0 \text{ when } oy<0$$

$$oy=sy-wy \text{ when } oy>sy-wy)$$

and a region having ox and oy is determined to be the cut out region 215.

FIG. 6 to FIG. 10 are flow charts showing the processing procedure of the supporting server 240 side in the preferred embodiment of this invention.

When the supporting server 240 is started (block 501), the supporting server 240 determines whether or not there is a connection request from the portable information terminal (block 503). When there is a connection request, the shell program is started to start the logical window system (block 507). In the preferred embodiment of this invention, the supporting server 240 can run a plurality of shell processes and enables connection to a plurality of portable information terminals to allow a parallel processing of shell processes.

"Logical window system" as used here means a window system in which an input from a physical mouse or keyboard is neglected and output to a physical video device is disabled. Because such logical window system does not access to a physical device, a plurality of such systems can be active simultaneously.

Then, processing capability information sent from the portable information terminal 210 is received (block 509), and the rendering instruction monitoring part 323, the rendering instruction sending part 329, the input information receiving part 311 and the input information analyzing part 315 are each activated (blocks 511, 513, 514, 515).

In the preferred embodiment of this invention, when the supporting server 240 starts, it re-renders the GUI screen of the supporting server 240 (block 512) and sends it to the portable information terminal 210 as a rendering instruction.

When the end of operation is detected (block 516), the logical window system and the shell process are ended (block 517, 518).

FIG. 7 is a flow chart showing a processing procedure of the rendering instruction monitoring part 323. The rendering instruction monitoring part 323 intervenes between the GUI of the window system 320 and the rendering driver 325 and can behave as if it is the rendering driver 325 relative to the image rendering engine 321 while it behaves as if it is the image rendering engine 321 relative to the rendering driver 325.

The rendering instruction monitoring part 323 monitors between the image rendering engine and the rendering driver, monitors all API's called for re-writing the GUI screen of the supporting server (block 521), prepares a rendering instruction based on this (block 523), and stores it in the rendering instruction storing part 327 of the supporting server 240 after image conversion (block 525, 527). FIG. 15 is an example of data of a typical rendering instruction in the preferred embodiment of this invention. Incidentally, if the resolution of the output device of the portable information terminal is sufficiently high, an output may be directly provided to the output device of the portable information terminal by omitting the process of rendering for the logical screen.

In the preferred embodiment of this invention, an image conversion is performed according to the processing capability specifying information sent from the portable information terminal 210. In the example of FIG. 11, the portable information terminal 210 notifies the supporting server 240 that an image of two gradations of white and black is handled. FIG. 16 shows a grey scale conversion from a color image to multi gradations of white and black while FIG. 17 shows a dithering conversion from multi gradations of white and black to two gradations of white and black. The dithering conversion may be replaced by optimizing with the error diffusion method known in the art. By performing various conversions which the portable information terminal 210 requires in the supporting server 240 side, the load of the portable information terminal 210 can be reduced and the communication volume between the server 240 and the portable information terminal 210 can be reduced.

The converted rendering instruction may be further compressed or encrypted according to the processing capability specifying information sent from the portable information terminal 210 and sent to the portable information terminal 210 where it may be decompressed for use.

FIG. 8 is a flow chart showing a processing procedure of the rendering instruction sending part 329. The rendering instruction sending part 329 monitors to see that a rendering instruction is stored in the rendering instruction storing part 327 (block 535). When it is detected that the rendering instruction has been stored in the rendering instruction storing part 327, the rendering instruction sending part 329 sends the rendering instruction to the portable information terminal 210 side (block 537). This procedure is continued until the end of processing (block 537) and, upon detection of the end of processing, the rendering instruction sending part 329 is deactivated. (block 541).

FIG. 9 is a flow chart showing a processing procedure of the input information receiving part 311. The input information receiving part 311, upon receiving operation start input information from the portable information terminal 210, determines that input information can be received (block 551), receives input information sent from the portable information terminal 210 side (block 553) and stores the input information in the input information storing part 313 of the supporting server 240 side (block 555). In input information receiving part 311 also, the procedure is continued until the end of operation (block 557) and, upon detection of the end of operation, the input information receiving part 311 is deactivated (block 459).

The input information analyzing part 315 monitors to see that input information is stored in the input information storing part 313 as shown in FIG. 10 (block 561) and analyzes the input information stored in the input information storing part 313 (block 563). In the preferred embodiment of this invention, the input information analyzing part 315 analyzes the received input information and converts it to a message of a form conforming to the window system installed in the supporting server for delivery to the window system 320 via a journal playback hook 397 (block 571).

The journal playback hook 397 is usually used together with a journal record hook. The journal record hook can record a window message generated by an operator input and reproduce the recorded window message by the journal playback hook.

In the preferred embodiment of this invention, the function of the journal playback hook is utilized. By delivering a window message generated in the input information analyzing part to the journal playback hook 397, the window system 320 can handle it as a window message generated within the window system. The window message delivered to the window system 320 is interpreted by the window system 320 to determine what input was given to what application and causes the GUI screen to be re-written. This re-writing of the GUI screen caused by the window message is outputted to the display device 245 as an image by the image rendering engine 321 and the rendering driver 325 of the window system 320.

In the input information analyzing part also, this procedure is continued until the end of operation (block 565) and, upon detection of the end of operation, the input information analyzing part 315 notifies each part of the end of operation (block 567) and is then deactivated (block 569).

As described in the above, according to this invention, a system is provided which is capable of executing a general purpose OS as used in a conventional PC and a high level application operating on such OS in a machine having limited resources.

In one mode of this invention, a small size portable terminal of a low cost and providing a high function is provided.

In one mode of this invention, a portable information terminal is provided which can execute an application used in home or office.

In one mode of this invention, a portable information terminal having a low probability of losing data is provided.

In one mode of this invention, it is possible to reduce the work of installing a remote control software which was generated in the side of remote controlling terminal for enabling a consolidated control of a system.

In one mode of this invention, a system is provided which is not affected by the type of a remote controlling terminal for realizing a common operability.

In one mode of this invention, it is possible to reduce the usage of resources of a remote controlling terminal for reducing the hardware requirement to enable a general purpose OS and a general purpose application to be used.

In one mode of this invention, a high speed remote control system is provided which reduces the volume of communication data between a remote controlling machine and a remote controlled machine in remote control operation.

In one mode of this invention, a remote control system is provided in which data is transmitted in a form optimum to a remote controlling machine in performing a remote control.

In one mode of this invention, a remote control system is provided which can simultaneously support a plurality of remote controlling machines in performing a remote control.

210: remote control machine
211: display screen
240: supporting server
303: input information monitoring part
307: input information sending part
311: input information receiving part
315: input information analyzing part
320: window system
329: rendering instruction sending part
333: rendering instruction receiving part
337: rendering instruction analyzing part
339: logical screen
341: display region specifying part

What is claimed is:

1. A method of functionally providing a general purpose windows operating system and an application program running under such operating system at a terminal having processing power, storage resources and/or display resolution insufficient to run said windows operating system and application program, comprising the steps of;
   (a) providing the general purpose windows operating system and application program running under such operating; system on a server connected to a communication network
   (b) remotely accessing said server from said terminal via said communication network and transmitting input information generated by an input device of said terminal to said server for said windows operating system and/or said application program;
   (c) receiving in said server the input information transmitted from said terminal and interfacing the input information to the windows operating system and/or application program;
   (d) generating first rendering image data at said server at a first image resolution consisting of a first number of bits per picture element by the windows operating system and outputting said first rendering image data from said windows operating system to a rendering instruction part of said server;
   (e) receiving said first rendering image data and converting said first rendering image data at said server to second rendering image data at a second image resolution consisting of a second number of bits per picture element less than the first number of bits by said rendering instruction part of said server;
   (f) forming a rendering instruction including said second rendering image data by said rendering instruction part of said server and transmitting said rendering instruction from said server to said terminal;
   (g) at the terminal, receiving the rendering instruction transmitted from the server to said terminal; and
   (h) displaying on a display screen of said terminal a windows image at the second image resolution according to the received rendering instruction.

2. A recording medium which stores therein a program executed in part by a portable computer and in part by a server for functionally providing a general purpose windows operating system and an application program running under such operating system at the portable computer, the portable computer having resources insufficient to run the windows operating system and application program, the server having a general purpose windows operating system and an application program running under such operating system, the portable computer and the server being connected to a communication network, the operating system having an image rendering engine for generating image rendering instructions at a first image resolution consisting of a first number of bits per picture element suitable for input to a corresponding image rendering driver of the operating system for display of a windows image at the first resolution on an image screen of the server, the portable computer having a display screen for display of a windows image at a second image resolution consisting of a second number of bits per picture element less than the first number of bits on an image screen of the portable computer, comprising:
   (a) program code for remotely accessing the server from the portable computer via the communication network and for transmitting processing capability specifying information from the portable computer to the server;
   (b) program code for transmitting input information generated by an input device of the portable computer to the server;
   (c) program code at the server for receiving the transmitted input information and interfacing the received input information to the windows operating system and/or application program;
   (d) at least one first image rendering instruction being generated at the first image resolution by the image rendering engine of the windows operating system;
   (e) program code at the server for converting the at least one first image rendering instruction to at least one second image rendering instruction at the second image resolution;
   (f) program code for transmitting the at least one second image rendering instruction to the portable computer; and
   (g) program code at the portable computer for receiving the transmitted at least one second image rendering instruction and displaying on the display screen of the portable computer a windows image at the second image resolution according to the received at least one second image rendering instruction.

3. A method for specifying a display region of a size of (wx, wy) to be displayed on a display screen from image data constituting a logical screen having a size of (sx, sy) stored in a portable information terminal, characterized in that the region of the size of (wx, wy) is specified as a display region starting from a starting point which is defined as:

$$ox=px(sx-wx)/((sx-1)$$

$$oy=py(sy-wy)/(sy-1)$$

where (px, py) is a coordinate position of a mouse pointer of the portable information terminal.

4. A method of functionally providing a general purpose windows operating system and an application program running under such operating system at a portable computer having resources insufficient to run the windows operating system and application program, comprising the steps of:
   (a) providing the general purpose windows operating system and application program running under such operating system on a server connected to a communication network, the windows operating system having an image rendering engine for generating image rendering instructions at a first image resolution consisting of a first number of bits per picture element, said image rendering instructions being suitable for input to a corresponding image rendering driver of the windows operating system for display of a windows image at said first resolution on an image screen of said server;

(b) remotely accessing the server from the portable computer via the communication network, the portable computer having a display screen for display of a windows image at a second image resolution consisting of a second number of bits per picture element less than the first number of bits;

(c) transmitting input information generated by an input device of the portable computer to the server via the communication system;

(d) at the server, receiving the transmitted input information and interfacing the received input information to the windows operating system and/or application program;

(e) generating at least one first image rendering instruction at the first image resolution by the image rendering engine of the windows operating system;

(f) at the server, converting said at least one first image rendering instruction to at least one second image rendering instruction at the second image resolution;

(g) transmitting the at least one second image rendering instruction to the portable computer via the communication network; and (h) at the portable computer, receiving the transmitted at least one second image rendering instruction and displaying on the display screen of the portable computer a windows image at the second image resolution according to the received at least one second image rendering instruction.

5. The method of claim 4 wherein the step of interfacing the received input information includes the step of converting the received input information into a form suitable for input to the windows operating system and inputting the converted input information into the windows operating system.

6. The method of claim 5 where the step of inputting the converted input information into the windows operating system employs a journal playback hook.

7. The method of claim 4 wherein the number of picture elements represented by the at least one first image rendering instruction is more than the number of picture elements represented by the at least one second image rendering instruction.

8. The method of claim 4 wherein the portable computer maintains a logical screen in memory that is larger than the display screen of the portable computer.

9. The method of claim 8 wherein the logical screen corresponds in size to the image generated by the image rendering engine of the windows operating system.

10. The method of claim 4 wherein the step of remotely accessing the server includes the step of transmitting information specifying a processing capability of the portable computer from the portable computer to the server via the communication network.

11. The method of claim 10 wherein the transmitted information specifying a processing capability of the portable computer is at least one of:

(a) maximum resolution information of a logical screen of the portable computer;

(b) maximum resolution information of a physical screen of the portable computer;

(c) bits per picture element information of the portable computer;

(d) color palette information of the portable computer; and (e) compression/decompression capability information of the portable computer.

12. The method of claim 4 wherein the server simultaneously provides a windows environment to a plurality of portable computers.

13. A system for functionally providing a general purpose windows operating system and an application program running under such operating system at a portable computer having resources insufficient to run the windows operating system and application program, comprising:

(a) a server having a general purpose windows operating system and an application program running under such operating system connected to a communication network, the operating system having an image rendering engine for generating image rendering instructions at a first image resolution consisting of a first number of bits per picture element suitable for input to a corresponding image rendering driver of the operating system for display of a windows image at the first resolution on an image screen of said server;

(b) a portable computer for remotely accessing the server from the portable computer via the communication network, the portable computer having a display screen for display of a windows image at a second image resolution consisting of a second number of bits per picture element less than the first number of bits;

(c) an input device on the portable computer for generating input information for transmission to the server;

(d) input information analyzing means at the server for interfacing input information received from the portable computer to the windows operating system and/or application program;

(e) the image rendering engine of the windows operating system generating at least one first image rendering instruction at the first image resolution;

(f) rendering instruction monitoring means at the server for converting the at least one first image rendering instruction to at least one second image rendering instruction at the second image resolution;

(g) means for transmitting the at least one second image rendering instruction to the portable computer; and (h) at the portable computer, means for receiving the transmitted at least one second image rendering instruction and displaying on the display screen of the portable computer a windows image at the second image resolution according to the received at least one second image rendering instruction.

14. A recording medium of claim 2 in which the processing capability specifying information is one of:

(a) maximum resolution information of a logical screen;

(b) maximum resolution information of a physical screen;

(c) bits per picture element information;

(d) color palette information; and (e) compression/decompression capability information, of the portable computer.

* * * * *